Patented June 6, 1939

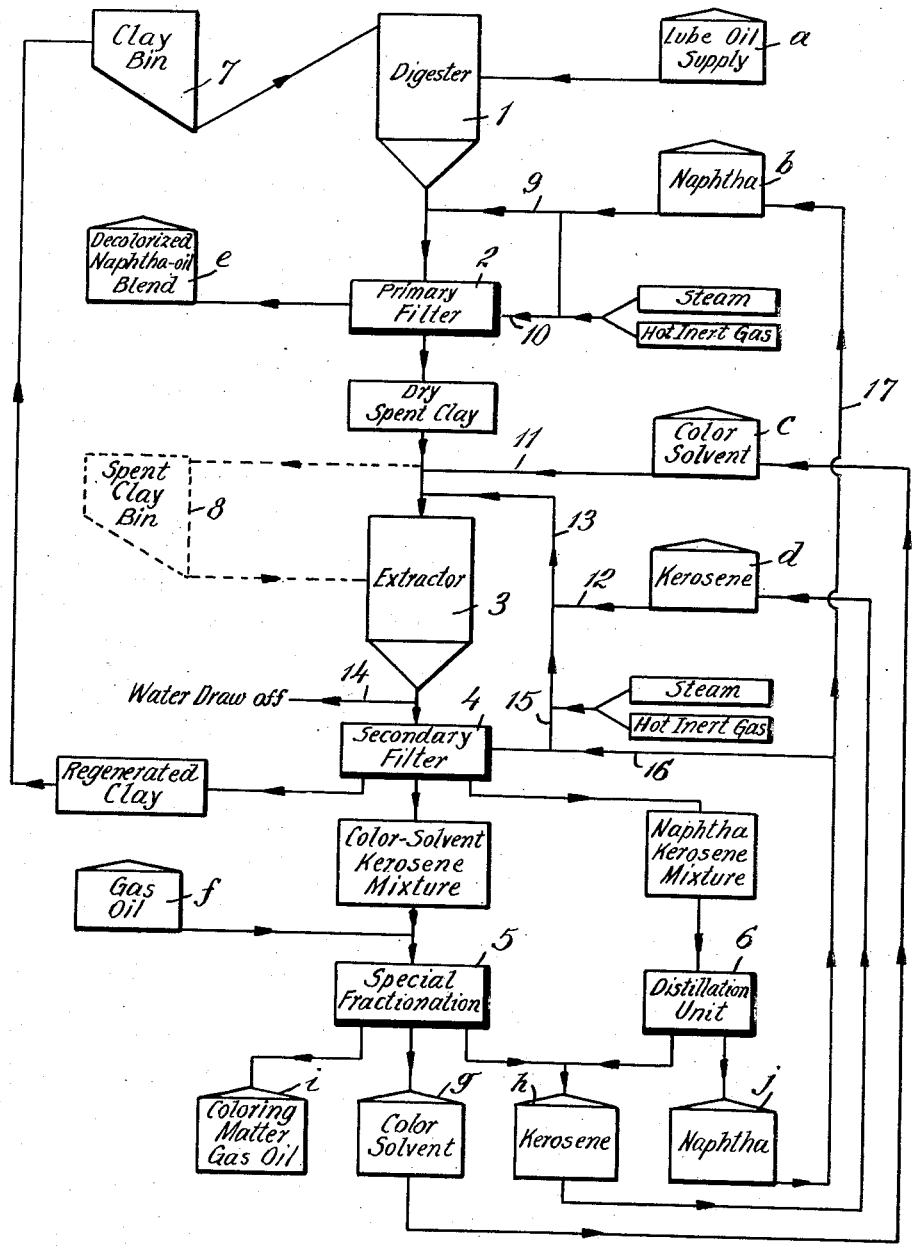

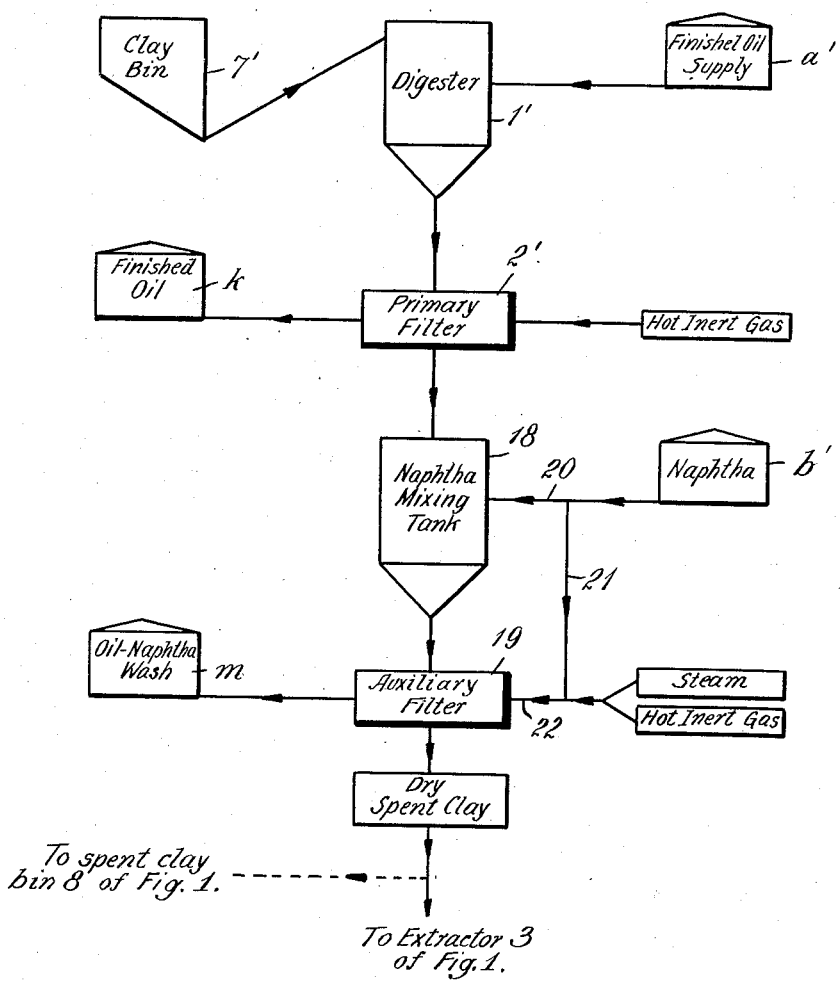

2,161,307

UNITED STATES PATENT OFFICE 2,161,307

SOLVENT REGENERATION OF DECOLORIZING ADSORBENTS

Albert E. Miller, Westfield, N. J., and William B. Chenault, Wellsville, N. Y., assignors to Sinclair Refining Company, New York, N. Y., a corporation of Maine Application October 18, 1938, Serial No. 235,612

8 Claims. (Cl. 252—2)

This invention relates to improvements in the processing of petroleum lubricating oils, and more particularly to improvements in the solvent regeneration of solid decolorizing agents, clays, treated clays and the like, used in such processing.

It is common practice, in the processing of petroleum lubricating oils, to decolorize the oils, usually after other processing, by maintaining a mixture of the oil and a solid decolorizing agent at an elevated temperature for an appropriate period of time and thereafter to separate the decolorizing agent contaminated with adsorbed coloring matter from the oil in a filter. The more effective solid decolorizing agents, acid treated clays for example, are too costly to be discarded after each such operation and must therefore be regenerated for re-use.

One general method of regeneration is to extract contaminating coloring matter from the decolorizing agent with a color solvent. Following such extraction the decolorizing agent must be freed from retained color solvent and the color solvent must be recovered for re-use. The color solvents generally used, and those more particularly involved in this invention, are of relatively low boiling range. These color solvents, moreover, are commonly used in the form of composite solvent mixtures including correspondingly low boiling hydrocarbon distillates. The coloring matter originally contaminating the lubricating oils processed is of boiling range within that of the fraction constituting the lubricating oil, and therefore is not to be removed from the lubricating oil by distillation. The decolorizing agent effects this removal by selective adsorption. Thus, in over-all operations including solvent regeneration of the decolorizing agent, the objectionable coloring matter is separated from the petroleum lubricating oil by adsorption, from the decolorizing agent effecting this adsorption by extraction, and from the solvent effecting this extraction usually by distillation, the solvent being of relatively low boiling range as compared to the coloring matter of boiling range corresponding to that of the lubricating oil.

The recovery of the color solvents for re-use, however, cannot economically be effected simply by redistillation of the solvent-extract mixture from the extraction step. For example, the decolorizing agent retains part of the color solvent following the extraction which must be separated from the decolorizing agent to make this part of the decolorizing agent available for re-use. This can be effected by washing the decolorizing agent, at this stage in the over-all operation, with an appropriate solvent for the color solvent, but this in turn requires recovery of the color solvent dissolved in such wash solvent. The cost of such wash solvent, and of its handling, is thus also involved in the economy of the over-all operation.

This invention comprises a special combination and sequence of steps which permits effective regeneration of the contaminated solid decolorizing agent by extraction with a suitable color solvent in a vessel separate from that in which the oil is decolorized and the recovery of the color solvent with high efficiency accomplishing valuable improvements in overall efficiencies of the regeneration treatment including the separate recovery of solvents other than the color solvent and important economies in equipment and space requirements necessary for the operation.

In accordance with this invention, the oil to be decolorized is contacted for an appropriate period with a solid decolorizing agent such as clay after which the oil is separated from the decolorizing agent in a primary filter, the oil retained in the decolorizing agent is displaced therefrom by washing with naphtha, and the retained naphtha is then removed from the decolorizing agent, for example by passing an inert gas through the decolorizing agent. The dry, substantially naphtha free but contaminated decolorizing agent is removed from the filter and, in a separate extraction vessel, the contaminating coloring matter is extracted therefrom by means of a suitable color solvent. The color solvent retained in the decolorizing agent, after displacement of the major portion of the color solvent containing the coloring matter, is removed by suitable washing and drying steps to accomplish the regeneration of the decolorizing agent, and is separately recovered as more completely described below.

The advantages attained from operation in accordance with our invention are numerous. Among these may be mentioned the increased overall operation efficiency attained by the separation of the oil or oil-naptha mixture from the decolorizing agent in a primary filter and the subsequent removal of the contaminated decolorizing agent from the filter to be extracted and regenerated in a separate vessel and filter. In this way considerable saving is realized in the length of time the primary filters are in use in the treatment of any given quantity of oil, thus making them available for treatment of further quantities of oil-clay mixtures. Further, the removal of the contaminated decolorizing agent to a separate extractor vessel results in more efficient extraction by the color solvent as a result of which a smaller amount of color solvent is needed for the extraction, and difficulties resulting from collapse of the filter cake in the filter during extraction are eliminated. As a result of the removal of the treated oil and the subsequent steaming and drying to remove naphtha from the decolorizing agent prior to its discharge from the primary filter, no problems attendant upon the use or storage of large quantities of wet clay are experienced and the contaminating coloring matter is not oxidized or otherwise affected in a manner which would render it difficult to remove with the color solvent. Further, the color solvent and other solvent agents are recovered with good efficiency for further use in the process.

In the regeneration of decolorizing agents and the recovery of solvents in accordance with our invention, the preliminary steps in the process may vary depending on the type of oil to be extracted by the decolorizing agent. According to one embodiment of this invention we employ a combined operation, the initial steps of which include decolorizing raw lubricating oil stocks and lubricating oil mixtures with a solid decolorizing agent, and diluting the oil with naphtha prior to separation from the said decolorizing agent in a filter. According to a further embodiment of the invention, the initial steps of the combined operation include the decolorizing of an otherwise finished lubricating oil which it is undesirable to contaminate with wash naphtha or other diluents before separation from the decolorizing agent in a filter.

In accordance with the first referred to embodiment, the lubricating oil or oil mixture after suitable digestion with the solid decolorizing agent, is diluted with a proportion of naphtha suitable to produce a 60:40 naphtha-oil blend, the naphtha-oil blend being subsequently separated from the decolorizing agent in a primary filter. The proportion of naphtha-oil mixture retained in the decolorizing agent is displaced therefrom by washing with a further quantity of naphtha and is added to the first separated naphtha-oil mixture to produce a blend of approximately 70 parts naphtha and 30 parts oil. The naphtha retained by the decolorizing agent is removed by treatment with an inert gas. This treatment should preferably consist of steaming followed by treatment with a hot inert gas to remove the mixture remaining in the decolorizing agent. The solid agent contaminated with coloring matter but substantially free of oil, naphtha and water is removed from the primary filter thus freeing the filter for separation of further quantities of decolorizing agent and oil. The dry contaminated decolorizing agent may be stored temporarily or may be passed directly to an extractor where the coloring matter is extracted with the color solvent, a sufficient quantity of kerosene added to render the mixture pumpable, the mixture pumped to a secondary filter where the kerosene and color solvent mixture is removed and the decolorizing agent is washed with a further quantity of kerosene. The kerosene retained by the decolorizing agent is then displaced by washing the agent in the filter with naphtha, the retained naphtha stripped therefrom by passing an inert gas therethrough, for example, by steaming, followed by a removal of the condensed moisture by passing through the agent while still in the filter or after removal from the filter a hot inert gas, such as air, or clean flue gas. The thus regenerated decolorizing agent is removed from the filter and is ready for re-use in decolorizing fresh quantities of oil. The kerosene and color solvent are recovered from the kerosene-color solvent mixture by suitable fractionation, preferably in the presence of a gas oil fraction to serve as a heavy residue in which the coloring matter is retained. The naphtha and kerosene are recovered separately from the mixture of the two resulting from the last washing of the decolorizing agent, by distillation.

According to the second above-referred-to embodiment it is possible to apply our process to the decolorizing of an otherwise finished lubricating oil which it is not desired to dilute with naphtha. In this case, the lubricating oil after suitable contact with the decolorizing agent, is separated therefrom in a filter, a quantity of oil in addition to that removed by filtration being blown out of the filter by clean flue gas or air. The contaminated decolorizing agent which still contains about 40%–55% decolorized oil is removed from the filter and mixed with a quantity of naphtha sufficient to render the mixture pumpable. The decolorizing agent is separated therefrom in an auxiliary filter, the naphtha and oil in the separated naphtha-oil mixture being separately recovered. The oil retained in the decolorizing agent is displaced by washing with naphtha, and the retained naphtha removed by steaming followed by a drying treatment with a hot inert gas. The contaminated decolorizing agent, substantially naphtha and moisture free, is removed from the auxiliary filter and may be temporarily stored, or may be treated with color solvent and regenerated and the solvents recovered as in the first described embodiment.

The naphtha used in carrying out the invention may be any appropriate petroleum fraction of boiling range sufficiently limited, as a maximum, to permit the subsequent stripping of this naphtha conveniently and economically. In general, a petroleum naphtha of boiling range approximating 200°–300° F. is used with advantage and such fraction may be taken as representative of naphtha useful in the process of the invention. The kerosene used in carrying out the invention may be any appropriate petroleum fraction of boiling range intermediate the naphtha used, and particularly any naphtha used as part of a composite color solvent mixture, and the lubricating oil processed, that is of boiling range appropriate to permit separation by fractional distillation from the naphtha used and for some purposes from extracted coloring matter. In general, a petroleum kerosene of boiling range approximating 350°–550° F. is used with advantage and such fractions may be taken as representative of kerosene useful in the process of the invention. When the color solvent is recovered from a kerosene-solvent mixture following the extraction, the separated coloring matter is discharged in solution in the kerosene or in a higher boiling part of the kerosene. Such kerosene fraction including the dissolved coloring matter may be supplied, for example, to a cracking operation without requiring separation of the dissolved coloring matter. However, if it is desirable or necessary to separate the kerosene from the coloring matter extracted from the decolorizing agent, gas oil is with advantage added to the kerosene-solvent mixture and the color solvent and the kerosene are separately recovered from this composite mixture by fractional distillation, the coloring material remaining in solution in the gas oil. The gas oil used in this embodiment of the invention may be of any appropriate petroleum fraction of boiling range appropriate to permit separation by fractional distillation from the kerosene used.

Ketones, such as, for example, acetone, methyl, ethyl ketone, methyl propyl ketone, diethyl ketone, dipropyl ketone and methyl isobutyl ketone are appropriate color solvents. In addition to the ketones, alcohols, for example, isopropyl alcohol and certain ethers, for example, isopropyl ether, and also halogen-containing organic solvents of the class typified by ethylenedichloride, trichloroethylene and carbon tetrachloride are suitable. Solvents of the above types or mixtures of them may be used as such, or in the form of composite color solvent mixtures with benzol, toluol, xylol naphtha or kerosene. In a mixture containing one of the above-listed or similar compounds, together with naphtha or kerosene, for example, the naphtha or kerosene content may vary from about 15% to 85%. The following is a specific example of a suitable color solvent mixture—25% ketone or alcohol, 25% benzol, 50% naphtha or kerosene. As previously pointed out, in the displacement of the color solvent containing the coloring matter retained in the decolorizing agent kerosene may be used with advantage. It is desirable, therefore, that the color solvent or color solvent mixture except for any kerosene content in such mixture, be capable of being separated by distillation from the larger bulk of kerosene solvents. Mixtures of solvents which can be distilled at temperatures below about 300° F. at atmospheric pressure can be so separated from kerosene.

Our invention will be further described in connection with the drawings in which Fig. 1 is a flow diagram of the application of our combined operation in treating raw lubricating oil stocks which are diluted with naphtha prior to their separation from the decolorizing agent; and Fig. 2 is a flow diagram of the preliminary steps of our combined operation when applied to the decolorizing of finished lubricating oils.

In accordance with the first mentioned method of operation as disclosed in Fig. 1, raw lubricating oil stock is passed from supply tank $a$ to digester $1$ where it is contacted with a suitable quantity of decolorizing clay which is conveyed to the digester from supply bin $7$. The clay may be new material or material regenerated by the herein described process or a mixture of the two. After contacting the oil and the decolorizing agent for an appropriate time and at an appropriate temperature, the mixture is diluted with an amount of naphtha drawn through line $9$ from tank $b$ sufficient to produce a 60:40 naphtha-oil blend in the digester. The mixture of oil, naphtha and clay is then pumped through primary filter $2$ to separate the clay. The decolorized oil-naphtha blend, free from decolorizing agent, is passed to storage tank $e$, the oil retained in the clay and in the filter being displaced by a further proportion of naphtha drawn from tank $b$ through line $10$. This added naphtha containing the oil displaced from the clay is added to the filtered decolorized portion in tank $e$, such addition producing a naphtha-oil blend having a ratio of about 70:30. This decolorized oil-naphtha may then be passed to a dewaxing plant or other suitable refining treatment. The excess naphtha retained in the clay from the just described displacement is then removed by stripping with steam supplied through line $10$. The moisture remaining in the filter and in the clay is then removed by blowing with a warm, dry gas, such as air or clean flue gas which may also be introduced through line $10$. The clay cake containing the removed coloring matter but substantially free of naphtha and water is removed from the primary filter and transported by a screw conveyor or other suitable means to extractor $3$ or to the spent clay storage bin $8$. The digester and primary filter are now available for the decolorizing of further quantities of oil. The remainder of the combined operation of the present invention involves the regeneration of the spent clay, and the recovery of reagents employed in the regeneration. A suitable volume of color solvent is pumped from tank $c$ through line $11$ to extractor $3$ where it is mechanically mixed with the spent clay for a period of time sufficient to extract the adsorbed coloring matter. This separate extractor vessel $3$ is provided with a mechanical stirrer and is advantageously a closed vessel provided with reflux means to prevent the loss of low boiling solvents. Sufficient kerosene is then added from tank $d$ through lines $12$ and $13$ to render the mixture pumpable. Any water which may have collected in the extractor may be removed through draw off line $14$, together with some of the color solvent in the event that the color solvent is miscible with water. Any color solvent so removed may then be recovered from the water. The mixture of clay, color solvent and kerosene is pumped from extractor $3$ to secondary filter $4$ to separate the clay. The color solvent is washed from the clay by an additional quantity of kerosene drawn from tank $d$ through lines $12$, $15$ and $16$. The color solvent-kerosene mixture separated in the filter together with this wash kerosene passes from the filter to a special fractionation unit $5$ which may advantageously consist of a pipe still and fractionating tower. A proportion of gas oil from tank $f$ is added to the just mentioned mixture before fractionation in order to act as a high boiling constituent in which the coloring matter extracted from the clay is retained. The fractionation unit $5$ yields three fractions: color solvent as overhead collected in tank $g$, kerosene as side stream collected in tank $h$, and gas oil containing coloring matter as bottoms collected in tank $i$. The kerosene retained by the clay in secondary filter $4$ is displaced by a proportion of naphtha drawn from tank $b$ or $j$ through lines $17$ and $16$. The naphtha retained in the clay from this displacement is removed by steaming through lines $15$ and $16$, and the excess moisture removed in turn by warm dry air passed through lines $15$ and $16$. The mixture of kerosene and naphtha removed from the filter $4$ is pumped to a distillation unit $6$ which separates the two. The kerosene may be added to run down tank $h$ and recycled to supply tank $d$, and the naphtha may be collected in run down tank $j$ and recycled to supply tank $b$. If desired, the run down tanks $g$, $h$, and $j$ may be eliminated and the distillation products pumped directly to the supply tanks $c$, $d$, and $b$, respectively. The mixture in tank $i$ may be disposed of by feeding it to a cracking unit. The regenerated clay is dumped from filter $4$ and conveyed to clay bin $7$ for further use.

In accordance with the second method of operation, a portion of which is illustrated in Fig. 2, finished oil is supplied to digester $1'$ where it is contacted with an appropriate quantity of decolorizing agent from clay bin $7'$ in the same manner as in the previous operation. The clay and the decolorized oil are then passed without dilution to primary filter $2'$ where the clay is separated from the oil. The finished decolorized oil is drawn off from the filter and sent to storage *k*, together with a quantity of excess oil added to the withdrawn portion by blowing the clay with a hot inert gas, such as air or clean flue gas. The spent clay which contains from 40% to 55% retained oil and adsorbed coloring matter is next passed to a naphtha mixing tank 18, a closed vessel with mechanical stirring means, where the adhering oil is removed from the clay by being dissolved in a limited proportion of naphtha which is added from tank *b'* through pipe 20. After stirring, the clay and oil-naphtha mixture is transferred to an auxiliary filter 19 where, after separation of the oil-naphtha mixture, the remainder of the oil is washed out with further quantities of naphtha added to the filter through lines 21 and 22. This wash naphtha is added to the oil-naphtha mixture removed from the filter and collected in tank *m*. This mixture is advantageously transferred to a reducing still where it is separated into its two components. The naphtha retained in the clay and in the filter is removed by steaming through line 22 and the excess moisture is then removed by adding a hot inert gas through line 22. The spent clay substantially free of naphtha and moisture is then conveyed to the extractor 3 of Fig. 1, and the clay regenerated by removing adsorbed coloring material and recovering the solvents as in the previously described operation, or it may be sent to spent clay bin 8 of Fig. 1 to be regenerated at a subsequent time.

We claim:

1. In the solvent regeneration of solid decolorizing agents contacted with petroleum lubricating oils to decolorize such oils, the improvement which comprises separating the oil from the decolorizing agent in a primary filter, displacing the retained oil from the decolorizing agent by washing it with naphtha, removing the decolorizing agent from the primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture and recovering the solvent therefrom by distillation, collecting the naphtha kerosene mixture and recovering the naphtha and kerosene therefrom by distillation, stripping retained naphtha from the extracted decolorizing agent by passing an inert gas therethrough in the secondary filter and removing the regenerated decolorizing agent from the secondary filter.

2. In the solvent regeneration of solid decolorizing agents contacted with petroleum lubricating oils to decolorize such oils, the improvement which comprises diluting the oil while in contact with the decolorizing agent with naphtha, separating the oil-naphtha mixture from the decolorizing agent in a primary filter, displacing the retained oil from the decolorizing agent by washing it with naphtha, removing the decolorizing agent from the primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture and recovering the solvent therefrom by distillation, collecting the naphtha kerosene mixture and recovering the naphtha and kerosene therefrom by distillation, stripping retained naphtha from the extracted decolorizing agent by passing an inert gas therethrough in the secondary filter and removing the regenerated decolorizing agent from the secondary filter.

3. In the solvent regeneration of solid decolorizing agents contacted with petroleum lubricating oils to decolorize such oils, the improvement which comprises separating the oil from the decolorizing agent in a primary filter and separating an additional quantity of oil by blowing the decolorizing agent with an inert gas, displacing the retained oil from the decolorizing agent by washing it with naphtha, removing the decolorizing agent from the primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture and recovering the solvent therefrom by distillation, collecting the naphtha kerosene mixture and recovering the naphtha and kerosene therefrom by distillation, stripping retained naphtha from the extracted decolorizing agent by passing an inert gas therethrough in the secondary filter and removing the regenerated decolorizing agent from the secondary filter.

4. In the solvent regeneration of solid decolorizing agents contacted with petroleum lubricating oils to decolorize such oils, the improvement which comprises separating the oil from the decolorizing agent in a primary filter, and separating an additional quantity of oil by blowing the decolorizing agent with an inert gas, removing the decolorizing agent from the primary filter and thereafter displacing the retained oil from the decolorizing agent by washing it with naptha, separating the naphtha-oil mixture from the decolorizing agent in an auxiliary primary filter, removing the decolorizing agent from the auxiliary primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture and recovering the solvent therefrom by distillation, collecting the naphtha kerosene mixture and recovering the naphtha and kerosene therefrom by distillation, stripping retained naphtha from the extracted decolorizing agent by passing an inert gas therethrough in the secondary filter and removing the regenerated decolorizing agent from the secondary filter.

5. In the solvent regeneration of solid decolorizing agents contacted with petroleum lubricating oils to decolorize such oils, the improvement which comprises separating the oil from the decolorizing agent in a primary filter, displacing the retained oil from the decolorizing agent by washing it with naphtha, stripping retained naphtha from the decolorizing agent by passing an inert gas therethrough in the primary filter, removing the decolorizing agent from the primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture, adding gas oil thereto and recovering the solvent and kerosene from the composite mixture by distillation, collecting the naphtha kerosene mixture and recovering the naphtha and kerosene therefrom by distillation, stripping retained naphtha from the extracted decolorizing agent by passing an inert gas therethrough in the secondary filter and removing the regenerated decolorizing agent from the secondary filter.

6. In the solvent regeneration of solid decolorizing agents contacted with petroleum lubricating oils to decolorize such oils, the improvement which comprises diluting the oil while in contact with the decolorizing agent with naphtha, separating the oil-naphtha mixture from the decolorizing agent in a primary filter, displacing the retained oil from the decolorizing agent by washing it with naphtha, stripping retained naphtha from the decolorizing agent by passing an inert gas therethrough in the primary filter, removing the decolorizing agent from the primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture, adding gas oil thereto and recovering the solvent and kerosene from the composite mixture by distillation, collecting the naphtha kerosene mixture and recovering the naphtha and kerosene therefrom by distillation, stripping retained naptha from the extracted decolorizing agent by passing an inert gas therethrough in the secondary filter and removing the regenerated decolorizing agent from the secondary filter.

7. In the solvent regeneration of solid decolorizing agents contacted with petroleum lubricating oils to decolorize such oils, the improvement which comprises separating the oil from the decolorizing agent in a primary filter, and separating an additional quantity of oil by blowing the decolorizing agent with an inert gas, displacing the retained oil from the decolorizing agent by washing it with naptha, stripping retained naptha from the decolorizing agent by passing an inert gas therethrough in the primary filter, removing the decolorizing agent from the primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture, adding gas oil thereto and recovering the solvent and kerosene from the composite mixture by distillation, collecting the naphtha kerosene mixture and recovering the naphtha and kerosene therefrom by distillation, stripping retained naphtha from the extracted decolorizing agent by passing an inert gas therethrough in the secondary filter and removing the regenerated decolorizing agent from the secondary filter.

8. In the solvent regeneration of solid decolorizing agents contacted with petroleum lubricating oils to decolorize such oils, the improvement which comprises separating the oil from the decolorizing agent in a primary filter and separating an additional quantity of oil by blowing the decolorizing agent with an inert gas, removing the decolorizing agent from the primary filter and thereafter displacing the retained oil from the decolorizing agent by washing it with naphtha, stripping retained naphtha from the decolorizing agent by passing an inert gas therethrough in an auxiliary primary filter, removing the decolorizing agent from the auxiliary primary filter and thereafter extracting in a separate extractor vessel contaminating coloring matter from the decolorizing agent with the color solvent, displacing solvent retained by the decolorizing agent by washing it in a secondary filter with kerosene and then displacing kerosene retained by the decolorizing agent by washing it in the secondary filter with naphtha, collecting the solvent and kerosene-solvent mixture, adding gas oil thereto and recovering the solvent and kerosene from the composite mixture by distillation, collecting the naphtha kerosene mixture and recovering the naphtha and kerosene therefrom by distillation, stripping retained naphtha from the extracted decolorizing agent by passing an inert gas therethrough in the secondary filter and removing the regenerated decolorizing agent from the secondary filter.

ALBERT E. MILLER.
WILLIAM B. CHENAULT.